No. 719,102. PATENTED JAN. 27, 1903.
G. H. FOLLOWS.
VARIABLE SPEED MECHANISM.
APPLICATION FILED JULY 14, 1902.
NO MODEL. 2 SHEETS—SHEET 1.
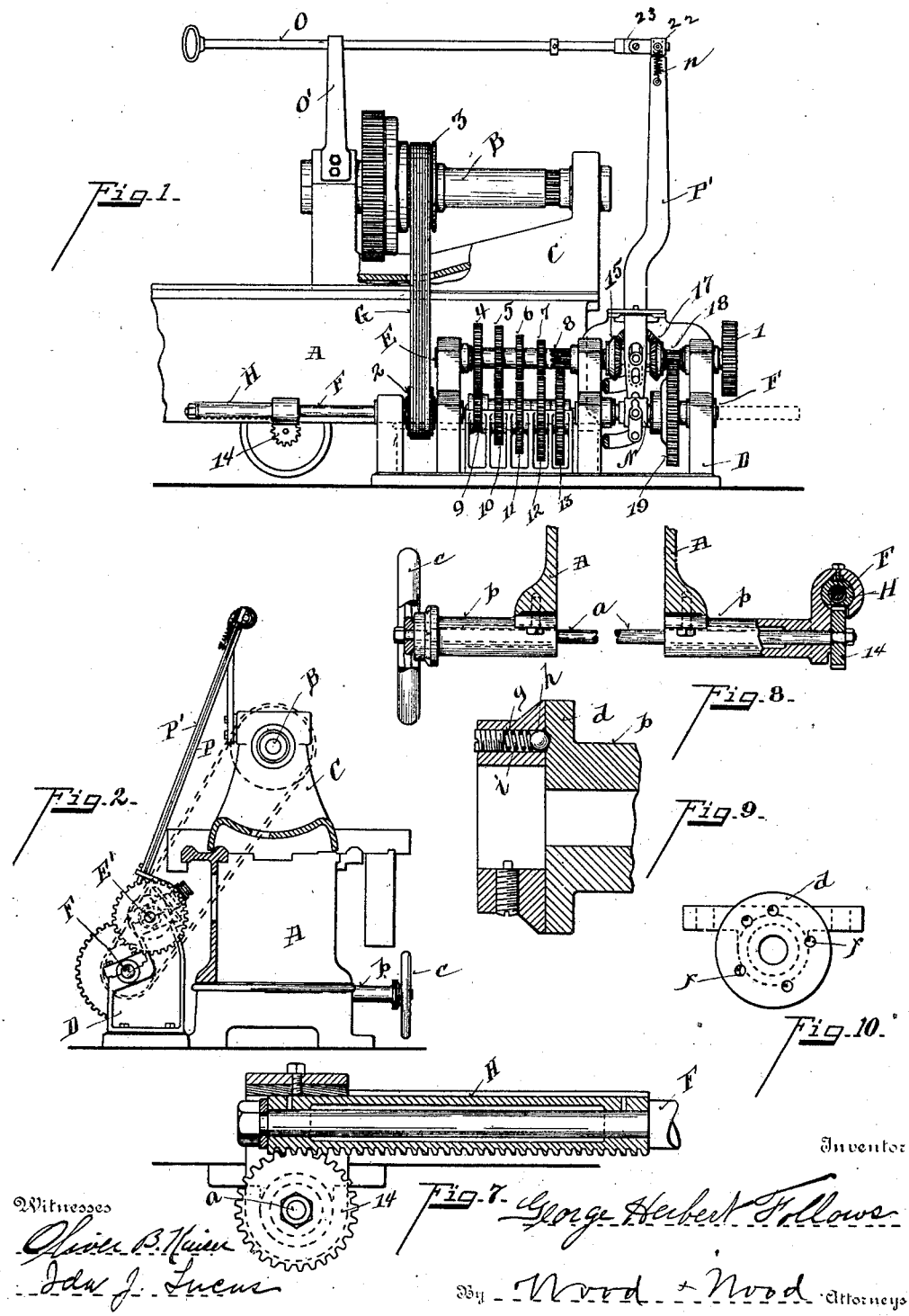

No. 719,102. PATENTED JAN. 27, 1903.
G. H. FOLLOWS.
VARIABLE SPEED MECHANISM.
APPLICATION FILED JULY 14, 1902.
NO MODEL. 2 SHEETS—SHEET 2.
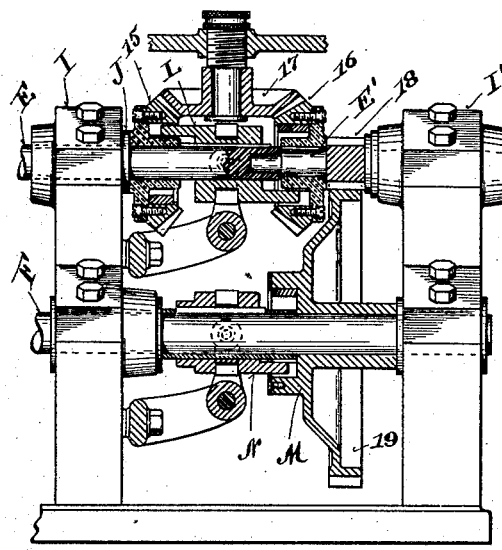
Fig. 4.
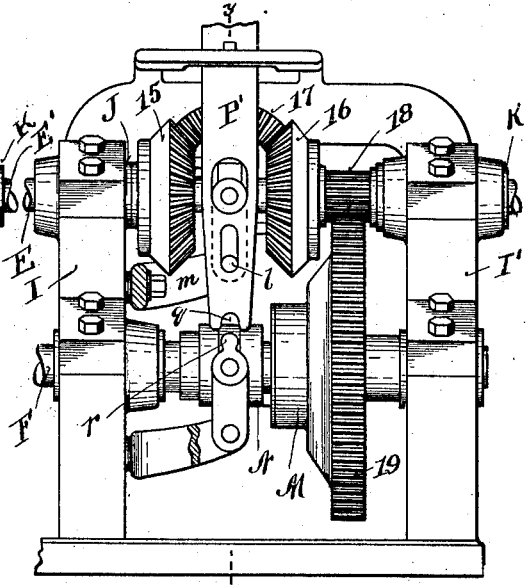
Fig. 3.
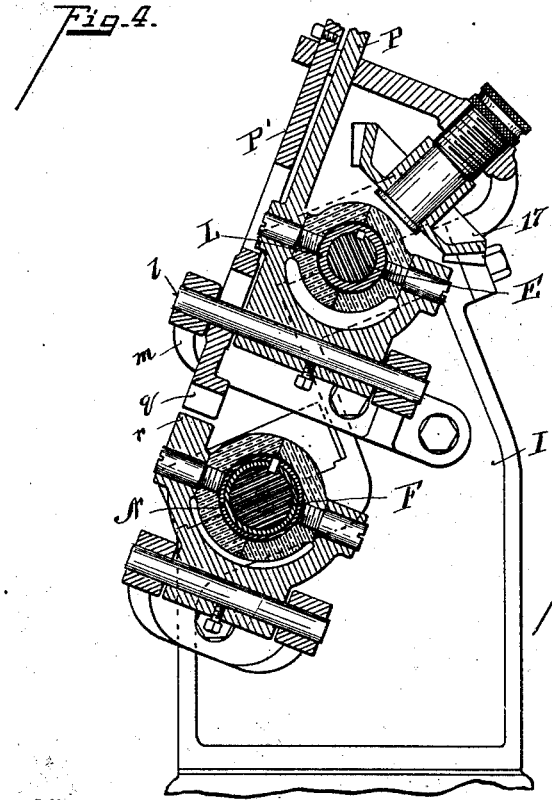
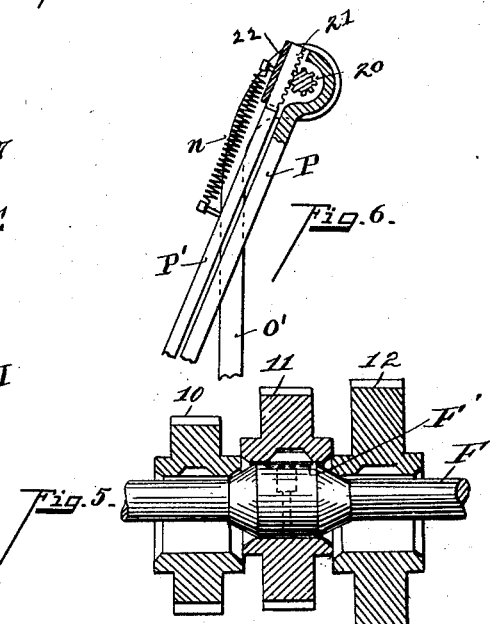
Witnesses
Inventor
George Herbert Follows
By Nord & Nord Attorneys

UNITED STATES PATENT OFFICE.

GEORGE HERBERT FOLLOWS, OF PITTSBURG, PENNSYLVANIA, ASSIGNOR TO THE LODGE & SHIPLEY MACHINE TOOL COMPANY, OF CINCINNATI, OHIO, A CORPORATION.

VARIABLE-SPEED MECHANISM.

SPECIFICATION forming part of Letters Patent No. 719,102, dated January 27, 1903.

Application filed July 14, 1902. Serial No. 115,454. (No model.)

*To all whom it may concern:*

Be it known that I, GEORGE HERBERT FOLLOWS, a citizen of the United States, residing at 331 South Highland avenue, Pittsburg, in the county of Allegheny and State of Pennsylvania, have invented certain new and useful Improvements in Variable-Speed Mechanism, of which the following is a specification.

My invention relates to the provision of a slowing-up device to be used in connection with that class of variable-speed device in which a sliding clutch is employed to fix any selected one of a plurality of differently-diametered gear-wheels to its shaft. In this class of variable-speed devices the fixing of any of the said loose gears to turn with this shaft must be effected while the gears are in motion, and hence if the gears are high-speeded or rotated under working strain there is a severe jar either to the teeth of the intermeshing gears or to the key of the clutch.

The object of my invention is to produce a slowing-up mechanism which insures a relatively slow rotation of the fixing-clutch when the change of speed is to be effected.

For convenience of illustration my device is shown as attached to and in connection with a variable-speed mechanism having the features and described in the Patent No. 683,003, issued to William L. Schellenbach September 17, 1901.

For further convenience of illustration my device is shown as applied to and embodied in a new organization of lathe structure, though it is evident that the principles of my invention may be applied to any organization of mechanical elements having a change of speed or feed for the desideratum.

The features of my invention are more fully set forth in the description of the accompanying drawings, forming a part of this specification, in which—

Figure 1 is an elevation of my improvement attached to a lathe. Fig. 2 is an end elevation showing the lathe structure in section. Fig. 3 is an elevation of my improved slowing-up device. Fig. 4 is a central sectional view of the same. Fig. 5 is a sectional view on line $y\,y$, Fig. 3. Fig. 6 is a detail sectional view of the shifting-levers of the slowing-up mechanism. Fig. 7 is a detailed sectional view of a clutch-shifting mechanism. Fig. 8 is a detailed sectional view of a hand-wheel for shifting the rack shown in Fig. 7. Fig. 9 is a detailed sectional view of a rotating hand-wheel and its support. Fig. 10 is a plan view of the end of a support on which the hand-wheel rotates. Fig. 11 is a sectional view illustrating the clutch for the loose gears on the driven shaft.

A represents the lathe-bed.

B represents a lathe-spindle mounted on the head-stock C.

D represents a separate stand bolted at the side of the lathe-bed and containing the variable-speed system. Within this separate stand D are journaled shafts E and F, E being relatively shown as the driving-shaft and F as the driven shaft.

1 represents the gear-wheel on shaft E, and it constitutes the prime mover.

2 represents a driven gear-wheel on shaft F. The gear 2 is connected, by means of a sprocket or chain transmitting-belt G, with a gear-wheel 3, fixed to the lathe-spindle.

4, 5, 6, 7, and 8 represent a series of gear-wheels fixed upon shaft E.

9, 10, 11, 12, and 13 represent correspondingly-arranged series of differently-diametered gear-wheels on shaft F, normally out of mesh with the fixed gear-wheels on shaft E and supported by casings normally eccentric to their shaft F. A sliding clutch F' is used on the shaft F, which travels within the bores of the pulleys 9 to 13, respectively, the said clutch being shown in Fig. 11 forming a part of shaft F, which is laterally movable within the pulley-bores. The purposes of this clutch are to lift any selected gear into intermesh with its opposing fixed gear and at the same time to fix the said loose gear to turn with the shaft F. These parts are fully described and shown in said Schellenbach patent, No. 683,003.

H represents the rack or sleeve within which shaft F is rotatively supported, the said sleeve and shaft being interlocked, so as to shift laterally together.

14 represents a pinion in intermesh with the teeth of the said rack, the said pinion being fixed on the end of a turning rod $a$, which said rod is journaled in a sleeve or support $b$.

$c$ represents a hand-wheel fixed on the other end of the turning rod $a$.

$d$ represents the flanged end of the support $b$, having the circular recesses $f$ on the face thereof. Within the face of the hand-wheel $c$, which abuts the face $d$ of the support $b$, is a hole $g$, within which is a ball $h$, supported by a spring $i$. This ball has an orbit of rotation concentric with the concentrically-arranged orifices $f$, and this arrangement constitutes an index mechanism. Each orifice represents one of the positions of engagement of the sliding clutch, and as the hand-wheel is rotated the ball is successively arrested or checked by the orifices, so that the engaged position of the clutch is indicated by the sense of touch to the hand of the operator.

The slowing-up device consists of the following parts:

I I' represent bracket supports or standards at one end of the variable-speed device above described, which form end supports of the shafts E F. The shaft E is a two-part shaft, having the part E', and these shafts are journaled in supports I I'.

J represents a sleeve journaled in the support I and forming a bearing for the shaft E.

K represents a sleeve journaled in the support I' and forming a journal for the stud-shaft E'. The stud-shaft E' and the shaft E are centered end to end, as shown in Fig. 4.

15 and 16 represent oppositely-placed beveled gear-wheels, gear 15 being loose on the shaft E and gear 16 being fixed to shaft E'. Between these two beveled gears 15 and 16 and intermeshed therewith, respectively, is a bevel gear-wheel 17, suitably journaled in a support in a plane at right angles to the planes of gear-wheels 15 and 16. The prime moving gear-wheel is fixed to the end of the stud-shaft E', which shaft is mounted in sleeve K.

L represents a right and left hand friction-clutch mounted on the shaft E between the gear-wheels 15 and 16 and splined so as to turn with said shaft and to slide thereon. When the said clutch L is moved to the left, the speed is transmitted from gears 16, 17, and 15, in the order named, to the shaft E. When the clutch L is shifted to the right, the shaft E is driven through gear-wheel 16 and clutch, in this instance the gear-wheels 15 and 17 being idlers. When the clutch is in the middle position, as shown, the shaft E is not rotated, and said gear-wheels 15, 16, and 17 all rotate as idlers.

On the shaft F, between the prime moving gear-wheel 1 and the bevel gear-wheel 16, is a small pinion 18, meshing with a larger gear-wheel 19, which is formed on the sleeve M, mounted on the shaft F.

N represents a friction-clutch sliding on shaft F for fixing the sleeve M and its gear-wheel 19 to the shaft F for rotating the same.

The following instrumentalities are employed in shifting the clutch: O represents a shifting-rod slidingly supported in the bracket O', so as to have a sliding movement. The bracket O' is shown as attached to the headstock of the lathe, but may be secured to the supporting structure of any other machine organization. P P' represent a double-arm lever for shifting the clutches L N, respectively. The fulcrum of this lever P is a pin $l$ between the shafts E F, as shown in Fig. 3. This pin $l$ passes through both lever-arms P P', as shown in Fig. 5, so that both of said lever-arms have a pivotal movement on the said pin, and the lever P' is slotted, so as to permit of a longitudinal moving of arm P on this fulcrum-pin $l$ independent of the lever-arm P. The levers P P' are attached at their outer ends to the shifting rod O and at right angles thereto. This connection is shown in Fig. 6, in which figure 20 represents the pinion on the end of the shaft-rod O, meshing with the rack 21 on the lever-arm P'. 22 represents a plate attached to the sleeve 23 on the end of rod O, in which sleeve the rod O turns.

$n$ represents a coil-spring, one end of which is attached to the plate 22 and the other end to lever P'. When the rod O is turned on its own axis, the engagement of the teeth of the pinion 20 with the rack 21 extends spring $n$ and moves the lever P' longitudinally relative to the lever P. When the handle of lever O is released, the spring will retract, drawing up lever P' and returning it to initial position. Thus when lever O is shifted longitudinally the lever-arms P P' will have a pivotal movement in unison. The lever P is connected to the clutch L for shifting the same, as shown in Fig. 4. The lever P' is connected to the clutch N for shifting the same.

Operation: The shaft E is driven in opposite directions, depending upon the position of the clutch L. The power is conveyed through any one of the driving-gears from 4 to 8 to any correspondingly-driven gears 9 to 13. If now it be desired to shift the clutch of the variable speed, the clutch L is moved by means of the handle O to the middle position, (shown in Figs. 3 and 4,) in which position shaft E is idle. The rod O is turned on its axis, which brings the notch end $q$ of the lever P' into engagement with the corresponding-shaped shoulder or knob $r$ on the clutch N. The clutch N shifts to the right, whereby the sleeve M and its gear-wheel 19 are fixed to the shaft F, and hence the shaft F is rotated at a relatively slow rate of rotation through the gears 18 and 19. As the levers P and P' are shifted in unison laterally, the clutch L is moved slightly to the left, when clutch N is shifted to the right; but it requires but a short throw to engage the clutch N, and hence clutch L is not shifted far enough to the left to be engaged at the same time that clutch N is being engaged. The clutch for the variable speed can then be shifted with perfect safety. When the shifting of the variable clutch has been effected, the lever P P' is shifted to release the clutch N, and when the handle O is released the lever-arm P' will be drawn to the normal position, (shown in Fig. 3,) and the shaft E can be driven in either direction at a rate of speed determined by the two selected gear-wheels of different diameter which have been intermeshed by the manipulation of the speed-changing mechanism.

Having described by invention, I claim—

1. In a variable-speed device a pair of shafts, a plurality of different-diametered gear-wheels, the gear-wheels on one of said shafts being loose relative thereto, a sliding clutch for fixing the said loose gears respectively to their shaft, a slowing-up device comprising a right and a left hand bevel-gear, on one of said shafts, an intermediate bevel-gear in mesh therewith, a clutch between said right and left hand bevel-gears adapted to fix either of said gears to its shaft, a pinion on said shaft, means for rotating same, a large diametered gear-wheel loose on the second shaft in mesh with said pinion, a sliding clutch adapted to fix said large gear-wheel to its shaft and means for shifting said clutches, substantially as described.

2. In a variable-speed device a driving and a driven shaft, a plurality of different-diametered gear-wheels fixed to the driving-shaft, a plurality of different-diametered gear-wheels loose on the driven shaft and adapted to be intermeshed with the opposing fixed gears, a sliding clutch on the driven shaft for said loose gear-wheels, a slowing-up device consisting of a prime moving wheel, a pinion, reversing-gears and clutch on the driving-shaft, a gear-wheel loose on the driven shaft and intermeshing with the said pinion, a clutch for fixing said wheel to the driven shaft and means for shifting the said clutches, substantially as described.

3. In a variable-speed device a driving and a driven shaft, a plurality of different-diametered gear-wheels fixed to the driving-shaft, a plurality of different-diametered gear-wheels loose on the driven shaft and adapted to be intermeshed with the opposing fixed gears, a sliding clutch on the driven shaft for said loose gear-wheels, a slowing-up device consisting of a prime moving wheel, a pinion, reversing-gears and clutch on the driving-shaft, a gear-wheel loose on the driven shaft and intermeshing with the said pinion, a clutch for fixing said gear-wheel to the driven shaft and a lever mechanism adapted to engage said clutches of the slowing-up device, whereby they may be controlled independently, substantially as described.

4. In a variable-speed device a driving and a driven shaft, variable-speed gears on said shafts adapted to be intermshed, a prime moving wheel, a pinion loose on the driving-shaft, a clutch for fixing the said pinion to turn with said shaft, a gear loose on the driven shaft intermeshing with said pinion, and a clutch on the driven shaft for fixing the said gear-wheel to the said driven shaft, substantially as described.

5. In a variable-speed device, a driving and a driven shaft, a prime moving wheel, a pinion and reversing-gears loosely mounted on the driving-shaft, a clutch on said shaft adapted to fix either of said reversing-gears to the shaft and to have an intermediate idle position, a loose gear on the driven shaft intermeshing with the said pinion, a clutch for fixing said gear-wheel to the driven shaft, a two-arm lever, one of which arms engages the clutch on the driving-shaft, the other of which is adapted to engage the clutch on the driven shaft, substantially as described.

6. In a variable-speed device, a driving and a driven shaft, a pinion loose relative to the driving-shaft, a clutch for fixing the said pinion to the driving-shaft, a gear-wheel loose on the driven shaft, intermeshing said pinion, a clutch on the driven shaft for fixing the said gear-wheel thereto, means for shifting said clutches and means for rotating the driving-shaft in combination with different-diameter gear-wheels oppositely placed on the said shafts and adapted to intermesh, substantially as described.

7. In a variable-speed device, a driving and a driven shaft, means for rotating the driving-shaft, a pinion and reversing gears loose on the driving-shaft, a clutch thereon for said reverse-gears, a gear-wheel on the driven shaft intermeshing with said pinion, a clutch for the last-named gear-wheel, a means for shifting the said clutches comprising a two-arm lever, one of said lever-arms engaging the clutch on the driving-shaft, a rack-and-pinion mechanism between the said arms, a handle for the said arms adapted to give said lever-arms a pivotal movement and adapted to be rotated on its axis, whereby the second arm is movable longitudinally relative to the first arm, substantially as described.

8. In a device of the class described, a driving and a driven shaft, a sliding clutch on said shafts respectively, a two-arm lever, one of said arms being adapted to engage the clutch on the driven shaft, a hand-lever for shifting said two lever-arms, a pinion on the end of said hand-lever, a rack on the end of one of the lever-arms intermeshing with said pinion for moving the second arm longitudinally relative to the first arm, and an interlocking device whereby the second arm may be engaged with the clutch on the driven shaft for shifting the same, enabling the clutches to be shifted by hand, either independently or simultaneously, substantially as described.

9. In a device of the class described, a driving and a driven shaft, a sliding clutch on one of said shafts, a rack connected to the sliding clutch, a journal-sleeve support extended at right angles to the rack, a turning rod within the said sleeve, a pinion on one end thereof engaging the said rack, a hand-wheel on the other end of said rod, the face of the hand-wheel abutting the support being provided with a hole, a coiled spring therein, and a ball seated within the hole against the spring, the abutting end face of the support being provided with a series of denoting-orifices arranged in the path of revolution of the ball and adapted to indicate to the touch the predetermined positions of adjustment of the clutch, substantially as described.

10. In a variable-speed device comprising a first and a second shaft, a plurality of different-diameter gear-wheels fixed to the first shaft, a plurality of different-diameter gear-wheels loose on the second shaft and adapted to be selectively intermeshed with the fixed gear-wheels, a sliding clutch on the second shaft, a slowing-up device comprising right and left hand bevel-gears loose on the first shaft, a bevel-gear between them, a prime moving wheel on the first shaft and a small pinion loose on the first shaft, a larger-diameter gear-wheel on the second shaft intermeshed with said pinion, a sliding clutch on the first shaft between the bevel-gears, a sliding clutch on the second shaft adapted to fix the large gear-wheel thereto, and means for shifting said clutches whereby the second shaft may be caused to rotate the first shaft, substantially as described.

11. In a variable-speed device a driving and a driven shaft, a plurality of different-diameter gear-wheels fixed to the driving-shaft, a plurality of different-diameter gear-wheels loose on the driven shaft, and adapted to be intermeshed with the opposing fixed gears, a sliding clutch on the driven shaft for said loose gear-wheels, a slowing-up device consisting of a prime moving wheel and a pinion loose relative to the driving-shaft, a clutch adapted to fix said gear-wheels to the driving-shaft, a gear-wheel loose on the driven shaft, a clutch for fixing said gear-wheel to the driven shaft, and lever mechanism for shifting said clutches whereby the normal driving relation of said shafts is reversed, substantially as described.

12. In combination with a variable-speed device, a driving and a driven shaft, a plurality of different-diameter gear-wheels oppositely disposed, the gear-wheels on the driving-shaft being fixed thereto and the gear-wheels on the driven shaft being loose, a sliding clutch on the driven shaft for intermeshing any two oppositely-disposed gear-wheels, relatively smaller and larger diametered transmitting-wheels on the said driving and driven shafts respectively, at one side of the first-named variable-speed gear-wheels, and connections between the said transmitting-wheels and their shafts respectively, adapted to bring said transmitting-wheels into train while loose on the driving-shaft, and fixed on the driven shaft, whereby the normal driving relationship of the shafts is reversed, and the normal speed slowed down, for the purpose of allowing the clutch of the variable-speed-gear-wheel system to be shifted, substantially as described.

In testimony whereof I have hereunto set hand.

GEORGE HERBERT FOLLOWS.

Witnesses:
OLIVER. B. KAISER,
IDA J. LUCAS.